United States Patent
Atchison et al.

(10) Patent No.: US 10,712,033 B2
(45) Date of Patent: Jul. 14, 2020

(54) CONTROL OF HVAC UNIT BASED ON SENSOR STATUS

(71) Applicant: Johnson Controls Technology Company, Auburn Hills, MI (US)

(72) Inventors: Shaun B. Atchison, Wichita, KS (US); Andrew M. Boyd, Wichita, KS (US); Noel A. Grajeda-Trevizo, Newton, KS (US); Tom R. Tasker, Andover, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/920,129

(22) Filed: Mar. 13, 2018

(65) Prior Publication Data
US 2019/0264937 A1    Aug. 29, 2019

Related U.S. Application Data

(60) Provisional application No. 62/636,000, filed on Feb. 27, 2018.

(51) Int. Cl.
| | |
|---|---|
| *F24F 11/32* | (2018.01) |
| *F24F 11/56* | (2018.01) |
| *F24F 11/74* | (2018.01) |
| *F24F 11/86* | (2018.01) |
| *G05B 19/048* | (2006.01) |
| *F24F 110/12* | (2018.01) |
| *F24F 110/22* | (2018.01) |

(Continued)

(52) U.S. Cl.
CPC .............. *F24F 11/32* (2018.01); *F24F 11/56* (2018.01); *F24F 11/74* (2018.01); *F24F 11/86* (2018.01); *G05B 19/048* (2013.01); *F24F 2110/12* (2018.01); *F24F 2110/22* (2018.01); *F24F 2110/40* (2018.01); *F24F 2140/00* (2018.01); *G05B 2219/2614* (2013.01)

(58) Field of Classification Search
None
See application file for complete search history.

(56) References Cited

U.S. PATENT DOCUMENTS

| 6,357,241 B1 | 3/2002 | Dudley |
|---|---|---|
| 7,412,842 B2 | 8/2008 | Pham |

(Continued)

FOREIGN PATENT DOCUMENTS

| CN | 102563811 A | 7/2012 |
|---|---|---|
| CN | 202883418 U | 4/2013 |

(Continued)

*Primary Examiner* — Ziaul Karim
(74) *Attorney, Agent, or Firm* — Fletcher Yoder, P.C.

(57) ABSTRACT

The present disclosure is directed to a system for a heating, ventilating, and air conditioning (HVAC) system includes a compressor configured to circulate a working fluid through the HVAC system, a fan configured to direct across a heat exchanger coil of the HVAC system, an ambient sensor configured to monitor a condition of an environment surrounding the heat exchanger coil, and a control system communicatively coupled to the ambient sensor, where the control system is configured to detect a status of the ambient sensor, and where the control system is configured to adjust operation of the compressor, or the fan, or both, upon detection of an error of the ambient sensor.

20 Claims, 7 Drawing Sheets

(51) Int. Cl.
    *F24F 110/40*     (2018.01)
    *F24F 140/00*     (2018.01)

(56) References Cited

U.S. PATENT DOCUMENTS

| | | |
|---|---|---|
| 7,712,320 B2 | 5/2010 | Bair, III et al. |
| 8,948,918 B2 | 2/2015 | Chamorro et al. |
| 9,562,710 B2 | 2/2017 | Pham et al. |
| 2010/0206869 A1 | 8/2010 | Nelson et al. |
| 2010/0293397 A1 | 11/2010 | Pham et al. |
| 2012/0031985 A1 | 2/2012 | Do et al. |
| 2012/0291984 A1 | 11/2012 | Li et al. |
| 2013/0139529 A1 | 6/2013 | Lu et al. |
| 2014/0208785 A1 | 7/2014 | Wallace et al. |
| 2014/0266755 A1* | 9/2014 | Arensmeier ............ G05B 15/02 340/679 |
| 2015/0027139 A1* | 1/2015 | Lin ........................ F25B 49/02 62/56 |
| 2015/0241856 A1* | 8/2015 | Walser ................... F24F 11/30 700/275 |
| 2017/0341486 A1 | 11/2017 | Petrak et al. |

FOREIGN PATENT DOCUMENTS

| | | |
|---|---|---|
| CN | 106839301 A | 6/2017 |
| GB | 2536161 B | 8/2017 |
| WO | 2017059021 A1 | 4/2017 |

\* cited by examiner

CONTROL OF HVAC UNIT BASED ON SENSOR STATUS

CROSS REFERENCE TO RELATED APPLICATIONS

This application claims priority from and the benefit of U.S. Provisional Application Ser. No. 62/636,000, entitled "CONTROL OF HVAC UNIT BASED ON SENSOR STATUS," filed Feb. 27, 2018, which is hereby incorporated by reference in its entirety for all purposes.

BACKGROUND

The present disclosure relates generally to environmental control systems, and more particularly, to a system for controlling a heating, ventilation, and air conditioning (HVAC) system based on a sensor status.

Environmental control systems are utilized in residential, commercial, and industrial environments to control environmental properties, such as temperature and humidity, for occupants of the respective environments. The environmental control system may control the environmental properties through control of an airflow delivered to the environment. In some cases, an HVAC system includes an ambient sensor to monitor conditions of an environment surrounding the HVAC system. As such, various components of the HVAC system are adjusted based on the monitored conditions of the environment surrounding the HVAC system. Control schemes of traditional HVAC systems are configured to shutdown operation of the HVAC system when a signal from the ambient sensor is interrupted or another error of the ambient sensor is detected. Unfortunately, shutting down operation of the HVAC system stops the HVAC system from providing conditioned air into a space within a residential, commercial, and/or industrial structure.

SUMMARY

In one embodiment of the present disclosure, a system for a heating, ventilating, and air conditioning (HVAC) system includes a compressor configured to circulate a working fluid through the HVAC system, a fan configured to direct across a heat exchanger coil of the HVAC system, an ambient sensor configured to monitor a condition of an environment surrounding the heat exchanger coil, and a control system communicatively coupled to the ambient sensor, where the control system is configured to detect a status of the ambient sensor, and where the control system is configured to adjust operation of the compressor, or the fan, or both, upon detection of an error of the ambient sensor.

In another embodiment of the present disclosure, a method for a heating, ventilation, and air conditioning (HVAC) system includes detecting an error of an ambient sensor of the HVAC system, determining a type of HVAC unit included in the HVAC system, determining a mode of operation of the HVAC unit, and operating a compressor and a fan of the HVAC system based on detection of the error of the ambient sensor, the type of HVAC unit, and the mode of operation of the HVAC unit.

In a further embodiment of the present disclosure, a control system for a heating, ventilation, and air conditioning (HVAC) system configured to execute a set of instructions, where the instructions are configured to detect an error of an ambient sensor of the HVAC system, determine a type of HVAC unit included in the HVAC system, determine a mode of operation of the HVAC unit, and operate a compressor and a fan of the HVAC system based on detection of the error of the ambient sensor, the type of HVAC unit, and the mode of operation of the HVAC unit.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to systems and methods for controlling a heating, ventilation, and air conditioning (HVAC) system when an error of an ambient sensor is detected. HVAC systems include an ambient sensor, such as an ambient temperature sensor, an ambient pressure senor, and/or an ambient humidity sensor, to monitor conditions of an environment surrounding the HVAC system. As such, various components of the HVAC system are adjusted based on the monitored conditions of the environment surrounding the HVAC system. As discussed above, traditional HVAC systems simply shut down upon detection of an error of the ambient sensor. However, shutting down the HVAC system also suspends a supply of conditioned air from reaching a space configured to be conditioned by the HVAC system. In other words, climate control for a conditioned space may be interrupted when an error of the ambient sensor is detected for existing HVAC systems.

Embodiments of the present disclosure are directed to controlling the HVAC system to continue supplying conditioned air to an environment when an error of the ambient sensor is detected. As used herein, an error of the ambient sensor may refer to an interruption of a signal from the ambient sensor to a control system of the HVAC system, a short circuit of the ambient sensor, a defect of the ambient sensor, another condition that causes data from the ambient sensor to be unavailable, or any combination thereof. In some embodiments, control of the HVAC system upon detection of an error of the ambient sensor is based on a type of HVAC unit included in the HVAC system and/or a mode of operation of the HVAC unit. For instance, when the HVAC system includes a heat pump, control of the HVAC system upon detection of an error of the ambient sensor may be different when the heat pump operates in a heating mode or in a cooling mode. Further, control of an HVAC system having an air conditioner may be different than control of the HVAC system having the heat pump. In some cases, operation of the HVAC system may continue even upon detection of an error of the ambient sensor. As such, a supply of conditioned air may continue to be directed into a conditioned space even when an error of the ambient sensor is detected.

Figure 1:
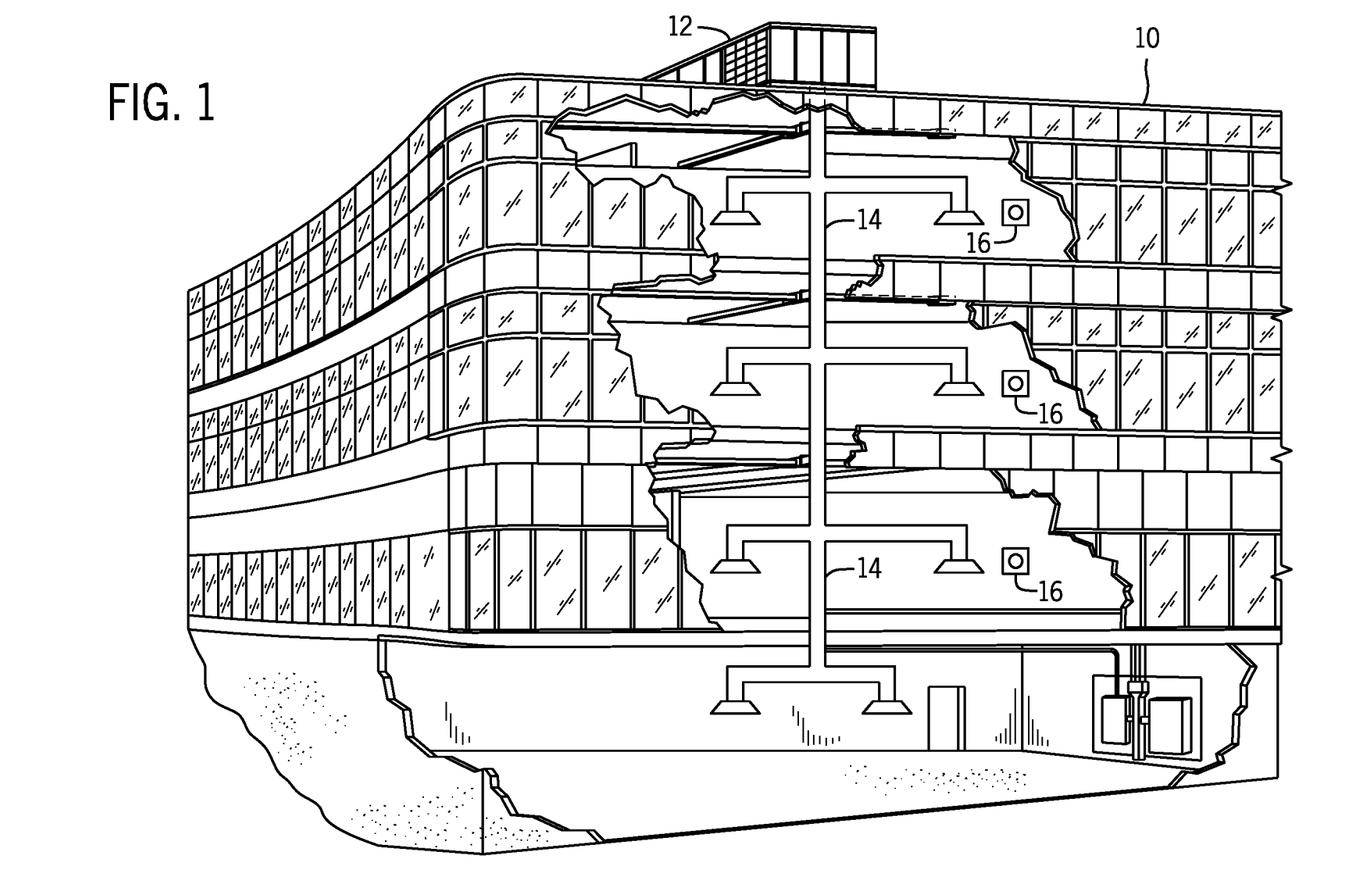
FIG. 1 is a schematic of an environmental control for building environmental management that may employ an HVAC unit, in accordance with an aspect of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
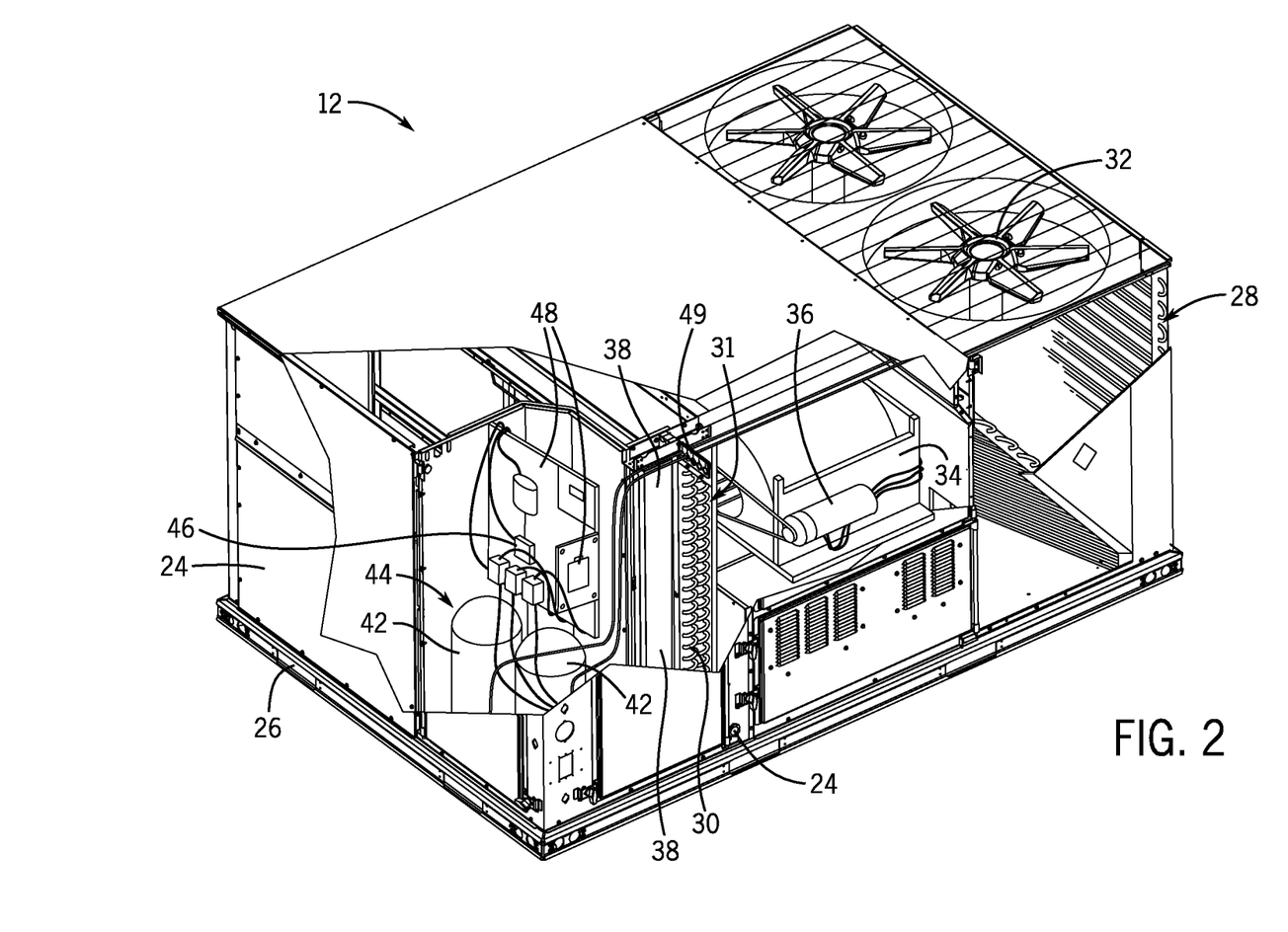
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
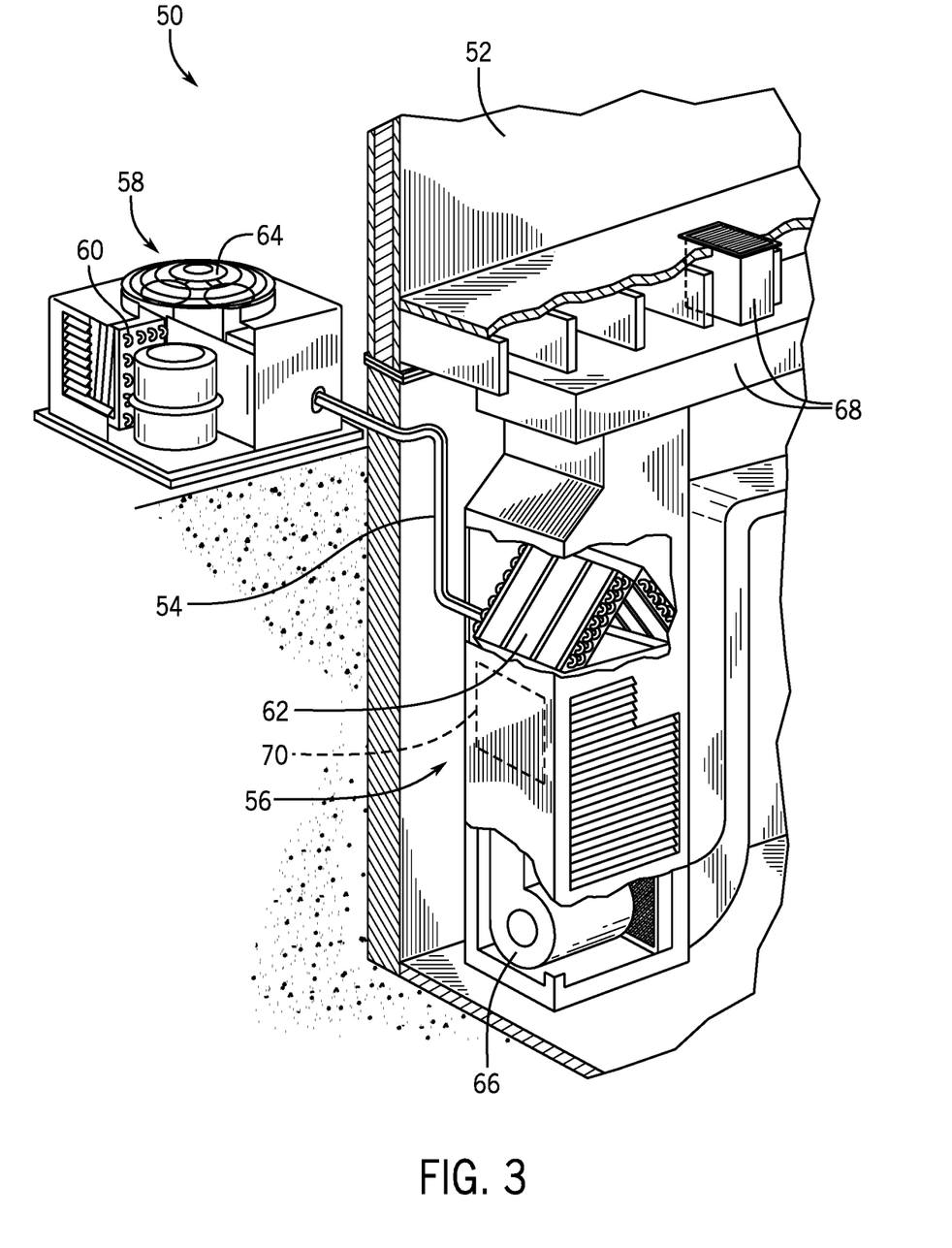
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
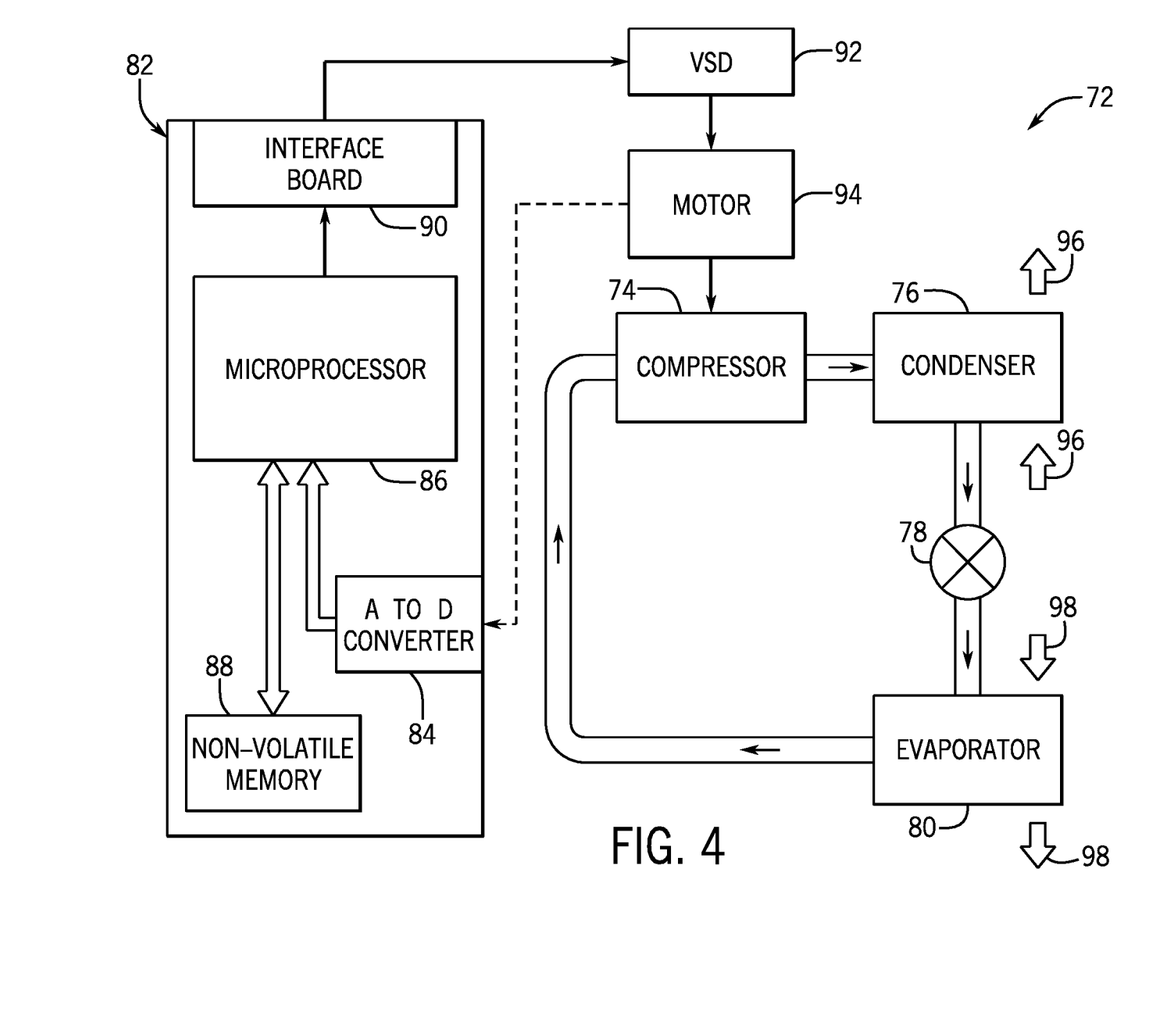
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
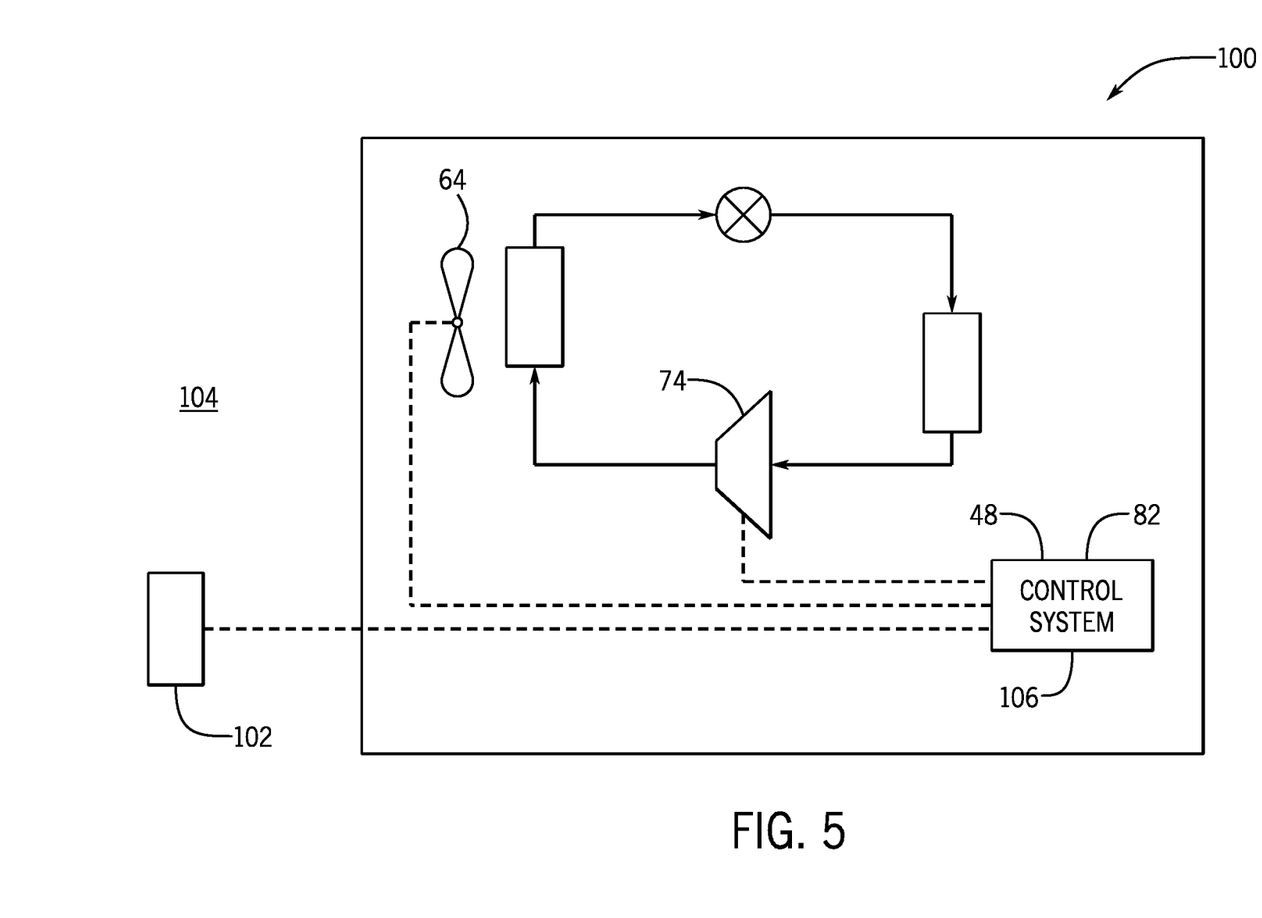
FIG. 5 is a schematic of an embodiment of a system configured to operate the HVAC unit of FIG. 1 and/or the residential heating and cooling system of FIG. 3 based on a sensor status, in accordance with an aspect of the present disclosure.

As set forth above, embodiments of the present disclosure are directed to systems and methods for controlling the HVAC unit 12 and/or the residential heating and cooling system 50, which are referred to collectively as an HVAC system 100, when an error of an ambient sensor 102 is detected by the control board 48 and/or the control panel 82. For instance, FIG. 5 is a schematic of an embodiment of the HVAC system 100 that may be controlled when an error of the ambient sensor 102 is detected. As shown in the illustrated embodiment of FIG. 5, the ambient sensor 102 is disposed in an environment 104 surrounding the HVAC system 100 to monitor a condition of the surrounding environment, such as a temperature, a pressure, a humidity, or another suitable operating parameter. The ambient sensor 102 is communicatively coupled to the control board 48 and/or the control panel 82, which are collectively referred to as a control system 106. Additionally, the control system 106 is communicatively coupled to the fan 64 of the outdoor HVAC unit 58 and/or the compressor 74.

The control system 106 is configured to receive feedback from the ambient sensor 102 and may adjust operating parameters of components of the HVAC system 100 based on the feedback. In some cases, the feedback, or a signal, from the ambient sensor 102 is interrupted or otherwise not usable by the control system 106, such that the control system 106 detects an error of the ambient sensor 102. In some embodiments, the control system 106 is configured to monitor a resistance of the ambient sensor 102, which may be indicative of an error of the ambient sensor 102. For example, when the resistance of the ambient sensor 102 falls outside of a target or predetermined range, the control system 106 may determine that an error of the ambient sensor has occurred, and may begin controlling the fan 64 and/or the compressor 74 of the HVAC system 100 in accordance with the embodiments of the present disclosure. The target range of the resistance of the ambient sensor 102 may be 500 Ohms to 500,000 Ohms, 750 Ohms to 400,000 Ohms, 1,000 Ohms to 350,000 Ohms, or 1,400 Ohms to 235,000 Ohms. When the resistance falls outside of the target range, the control system 106 may record an error of the ambient sensor 102 and initiate an ambient sensor error control mode.

As discussed in detail below, the control system 106 controls operation of the fan 64 and/or the compressor 74 when an error of the ambient sensor 102 is detected. In some embodiments, control of the fan 64 and/or the compressor 74 depends on components included in the HVAC system 100, or a type of HVAC unit included in the HVAC system 100. For instance, control of the fan 64 and/or the compressor 74 may be different for embodiments including heat pump when compared to embodiments including an air conditioner. Further, some HVAC units of HVAC systems 100 include multiple operating modes, which may also create variability in controlling the fan 64 and/or the compressor 74 in the event of an error to the ambient sensor 102.

Figure 6:
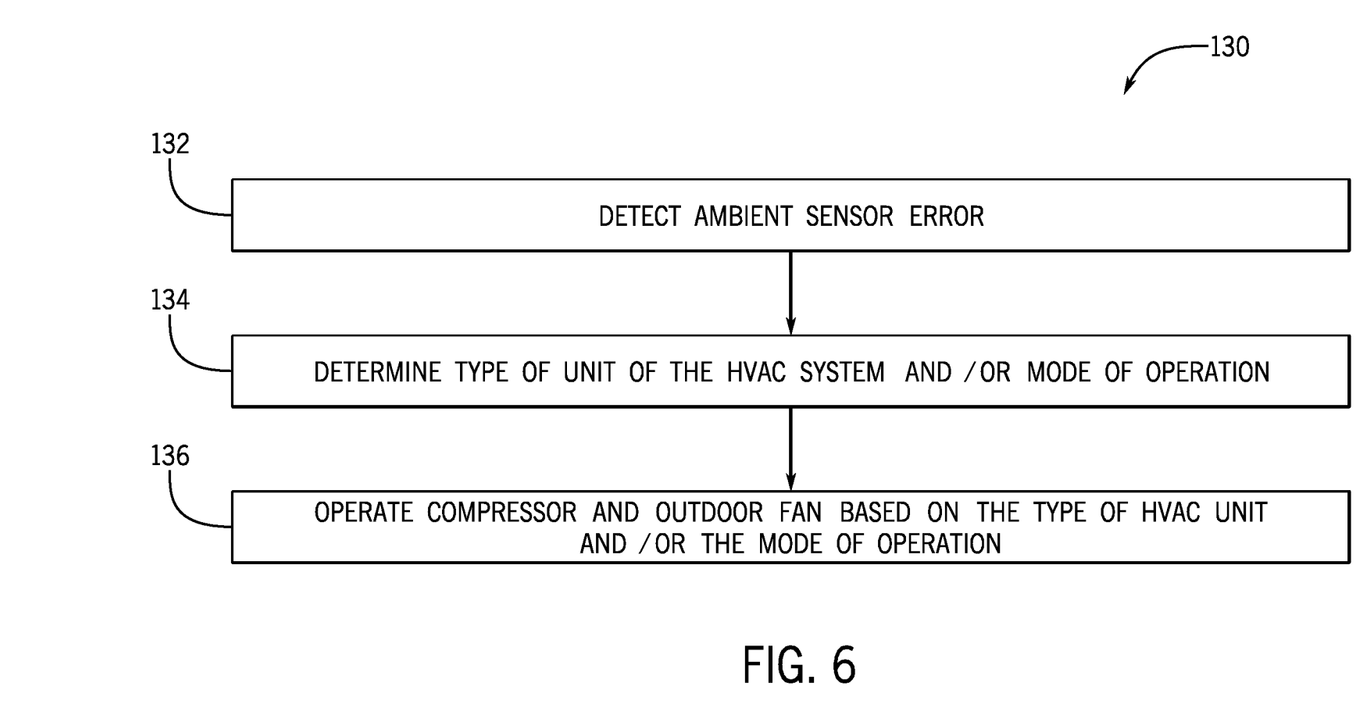
FIG. 6 is a block diagram of an embodiment of a process for operating the HVAC unit of FIG. 1 and/or the residential heating and cooling system of FIG. 3 based on a sensor status, in accordance with an aspect of the present disclosure.

FIG. 6 is a block diagram of an embodiment of a process 130 for controlling the fan 64 and/or the compressor 74 of the HVAC system 100 when an error of the ambient sensor 102 is detected. For instance, at block 132, the control system 106 detects an error of the ambient sensor 102. As discussed above, the error of the ambient sensor 102 may include an interruption of a signal from the ambient sensor 102 to the control system 106, a short circuit of the ambient sensor 102, a defect of the ambient sensor 102, another event interrupting operation or performance of the ambient sensor 102, or any combination thereof. Additionally, the control system 106 may detect the error of the ambient sensor 102 via a resistance measurement of the ambient sensor 102. For example, the ambient sensor 102 draws electrical current to operate, and thereby creates an electrical resistance across terminals of the ambient sensor 102. When the resistance of the ambient sensor 102 falls outside of a target range, the control system 106 detects the error of the ambient sensor 102 and may then determine a type of unit included in the HVAC system 100 and/or a mode of operation of the unit, as shown at block 134. As used herein, a unit of the HVAC system 100 may include a portion or subsystem of the HVAC system 100, which may be a heat pump, an air conditioner, another vapor compression system, or any combination thereof.

At block 136, the control system 106 may determine an appropriate control scheme for components of the HVAC system 100 based on the type of unit included in the HVAC system 100 and/or a mode of operation. As discussed in detail below, in some embodiments, the control system 106 enables operation of the fan 64 and/or the compressor 74 even when the error of the ambient sensor 102 is detected.

Figure 7:
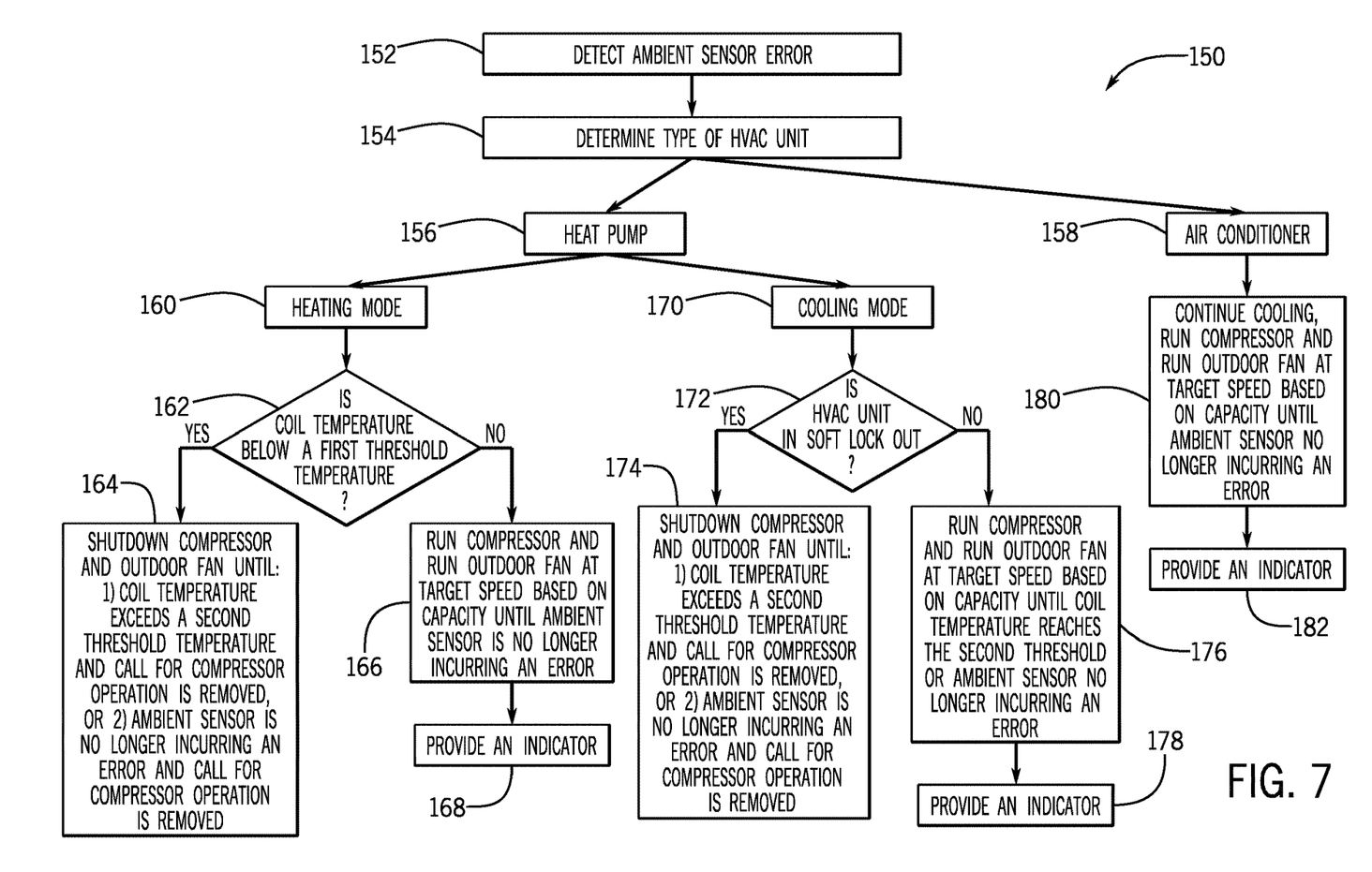
FIG. 7 is a block diagram of an embodiment of a process for operating the HVAC unit of FIG. 1 and/or the residential heating and cooling system of FIG. 3 based on a sensor status, in accordance with an aspect of the present disclosure.

FIG. 7 is a block diagram of an embodiment of a detailed process 150 that may be utilized to adjust operation of the fan 64 and/or the compressor 74 of the HVAC system 100 when the error of the ambient sensor 102 is detected by the control system 106. As shown in the illustrated embodiment of FIG. 7, the control system 106 detects an error of the ambient sensor 102 at block 152, similar to block 132 of FIG. 6. The control system 106 may then determine a type of unit included in the HVAC system 100, as shown at block 154. In some embodiments, the control system 106 is pre-programmed during installation of the HVAC system 100 based on the type of unit included in the HVAC system 100. In other embodiments, the control system 106 determines the type of unit included in the HVAC system 100 based on connections and/or communications with various components of the HVAC system 100. For instance, the control system 106 may be communicatively coupled to a reversing valve that enables a heat pump of the HVAC system 100 to switch between a heating mode and a cooling mode. Accordingly, based on the communicative connection with the reversing valve, the control system 106 determines that the unit of the HVAC system 100 is a heat pump. In still further embodiments, the HVAC system 100 may include multiple units, and thus multiple ambient sensors corresponding to respective units of the HVAC system 100. In such embodiments, the control system 106 may associate a respective ambient sensor that incurs an error with a corresponding unit of the HVAC system 100 and determine the type of unit based on the connections and/or communications with components of the HVAC system.

As a non-limiting example, the types of units included in the HVAC system 100 include a heat pump, as shown at block 156, and an air conditioning unit, as shown at block 158. However, it should be understood that additional types of units of the HVAC system 100 may be detected and/or included in the HVAC system 100. As shown in the illustrated embodiment of FIG. 7, when the control system 106 determines that the unit of the HVAC system 100 is a heat pump, the control system 106 may further determine whether the heat pump is in a heating mode or a cooling mode. As used herein, a heat pump refers to a vapor compression system that may reverse a flow of working fluid circulated through the components of the vapor compression system, such that the heat pump may absorb heat in an indoor coil to provide cool air to a conditioned space or transfer heat to the indoor coil to provide heated air to a conditioned space. Operation of the heat pump when an error of the ambient sensor 102 is detected may differ for the heating mode and the cooling mode.

For example, at block 160, the control system 106 recognizes that the heat pump is in the heating mode. For instance, the control system 106 may receive a demand for warm air from a temperature control device, such as a thermometer, located in the conditioned space. When the heat pump is operating in the heating mode and the control system 106 detects an error of the ambient sensor 102, the control system 106 may compare feedback from a coil sensor to a threshold value, as shown at block 162. In some embodiments, the coil sensor is configured to monitor a temperature of working fluid flowing through an outdoor coil of the heat pump, such as the heat exchanger 60. When the heat pump operates in the heating mode, the outdoor coil is functions as an evaporator, thereby transferring thermal energy from an environment surrounding the heat pump to the working fluid. Accordingly, when a temperature of the working fluid in the outdoor coil falls below a first threshold value, the working fluid may not be absorbing sufficient thermal energy to transition from a liquid state into a vapor state, or evaporate.

At block 164, when the temperature of the working fluid in the outdoor coil falls below the first threshold value, the control system 106 may activate a soft lock out of the heat pump. As used herein, a soft lock out refers to a temporary shutdown of the heat pump, where operation may continue when certain conditions are satisfied. For example, the control system 106 may remove the soft lock out and resume operation of the heat pump when a temperature of the working fluid in the outdoor coil reaches a second a threshold, where the second threshold is greater than the first threshold. In some embodiments, the first threshold is between 35° F. and 40° F., or between 1.5° C. and 4.5° C., and the second threshold is between 37° F. and 45° F., or between 2.5° C. and 7° C. Additionally, the control system 106 may remove any pending calls for operation of the compressor 74 before resuming operation of the heat pump. Alternatively, the control system 106 may remove the soft lock out and resume operation of the heat pump when the error to the ambient sensor 102 no longer exists. For instance, the control system 106 may determine that the resistance created by the ambient sensor 102 falls within the target range, and thus, that an error to the ambient sensor 102 is no longer present. As such, the control system 106 may remove any pending calls for operation of the compressor 74 and begin resuming operation of the heat pump.

At block 166, the control system 106 determines that the temperature of the working fluid flowing through the outdoor coil is above the first threshold and operates the compressor 74. Additionally, the control system 106 operates the fan 64 at a target speed. In some embodiments, the target speed of the fan 64 is a maximum speed determined by a capacity of the fan 64. Accordingly, the fan 64 may draw a relatively high flow rate of air across the outdoor coil, thereby increasing an amount of thermal energy transferred to the working fluid within the outdoor coil. The heat pump continues operation and supplies conditioned air to the environment despite the error to the ambient sensor 102. The heat pump may operate the compressor and operate the fan 64 at the target speed until the error to the ambient sensor 102 no longer exists.

In some cases, an occupant of the conditioned space that receives air from the HVAC system 100 may not be aware of the error to the ambient sensor 102 because the heat pump continues operating. As such, at block 168, the control system 106 may actuate an indicator to signal to the occupant of the conditioned space that an error of the ambient sensor 102 occurred. In some embodiments, the indicator to the occupant of the environment may include illuminating a light emitting diode (LED) on a component of the HVAC system 100, such as a temperature control device or another suitable component of the HVAC system 100 that is visible to the occupant, emitting a sound, sending a message to an electronic device of the occupant, or activating another suitable indicator that may signal to the occupant that the error to the ambient sensor 102 occurred.

As discussed above, the heat pump may also operate in a cooling mode. Accordingly, at block 170, the control system 106 recognizes that the heat pump is in the cooling mode. For instance, the control system 106 may receive a demand for cool air from a temperature control device, such as a thermostat, located in the conditioned space to determine that the heat pump is in the cooling mode.

In some instances, the heat pump frequently switches between the heating and cooling modes. Accordingly, when the control system 106 determines that the heat pump is operating in the cooling mode, the heat pump may be in a soft lock out as a result of the temperature of the working fluid flowing in the outdoor coil falling below the first threshold. Therefore, the control system 106 may determine whether the heat pump is in a soft lock out after determining that the heat pump is operating in the cooling mode, as shown at block 172. At block 174, when the heat pump is in a soft lock out, the heat pump may be shutdown until certain conditions are satisfied, as discussed above with respect to block 164. If the control system 106 determines that the heat pump is not in a soft lock out, as shown at block 176, the control system may operate the compressor 74 and also operate the fan 64 at the target speed, similar to block 166. The control system 106 may continue to operate the heat pump with the fan 64 at the target speed until the temperature of the working fluid in the outdoor coil exceeds the second threshold temperature and/or until the error to the ambient sensor 102 no longer exists. As discussed above, the occupant of the conditioned space may not be aware of the error to the ambient sensor 102. Therefore, at block 178, the control system 106 activates the indicator to signal to the occupant that an error to the ambient sensor 102 occurred.

As discussed above, in some embodiments, the control system 106 determines that the unit of the HVAC system 100 includes an air conditioner, as indicated by block 158. For example, the control system 106 may recognize an absence of a reversing valve that is typically included in the heat pump and may therefore determine that the unit is an air conditioner. At block 180, when the control system determines that the unit of the HVAC system 100 is an air conditioner, the control system may operate the compressor 74 and operate the fan 64 at the target speed, similar to blocks 166 and 176. The control system 106 may continue to operate the air conditioner with the fan 64 at the target speed until the error to the ambient sensor 102 no longer exists. As discussed above, the occupant of the conditioned space may not be aware of the error to the ambient sensor 102. Therefore, at block 182, the control system 106 activates the indicator to signal to the occupant that an error to the ambient sensor 102 occurred.

As set forth above, embodiments of the present disclosure may provide one or more technical effects useful in operation of HVAC systems. For example, typical HVAC systems may shutdown, and thus not supply conditioned air to an environment, when an error to a sensor is detected. As such, embodiments of the present disclosure are directed to control schemes of the HVAC system that enable operation of the HVAC system to continue when an error of a sensor is detected. The control schemes of the HVAC system may depend on a type of unit included in the HVAC system and/or an operating mode of the unit at the time the error to the sensor is detected. When the sensor error no longer exists, the HVAC system may resume normal operation. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for a heating, ventilation, and air conditioning (HVAC) system, comprising:
    a compressor configured to circulate a working fluid through the HVAC system;
    a fan configured to direct an air flow across a heat exchanger coil of the HVAC system;
    an ambient sensor configured to monitor a condition of an environment surrounding the heat exchanger coil;
    a control system communicatively coupled to the ambient sensor, wherein the control system is configured to detect a status of the ambient sensor during an active operating mode of the HVAC system, wherein the control system is configured to adjust operation of the compressor, or the fan, or both, in response to detection of an error of the ambient sensor, and wherein the error of the ambient sensor comprises an interruption of a signal from the ambient sensor to the control system, a short circuit of the ambient sensor, a defect of the ambient sensor, or any combination thereof.

2. The system of claim 1, wherein the control system is configured to adjust a speed of the compressor in response to detection of the error of the ambient sensor.

3. The system of claim 1, wherein the control system is configured to adjust a speed of the fan to a target speed in response to detection of the error of the ambient sensor.

4. The system of claim 1, comprising a coil sensor communicatively coupled to the control system, wherein the coil sensor is configured to measure an operating parameter of the working fluid flowing through the heat exchanger coil.

5. The system of claim 4, wherein the HVAC system is a heat pump, wherein the control system is configured to shut down the compressor and the fan in response to detection of the error of the ambient sensor, in response to feedback received from the coil sensor indicating that the operating parameter of the working fluid is below a threshold value, and in response to the HVAC system operating in a heating mode.

6. The system of claim 5, wherein the control system is configured to activate the compressor and the fan in response to the feedback received from the coil sensor indicating that the operating parameter of the working fluid exceeds an additional threshold value, wherein the additional threshold value is greater than the threshold value.

7. The system of claim 5, wherein the control system is configured to activate the compressor and the fan in response to the control system detecting that the ambient sensor is operational.

8. The system of claim 1, wherein the ambient sensor is an ambient temperature sensor.

9. The system of claim 1, wherein the control system is configured to monitor a resistance of the ambient sensor to determine the status of the ambient sensor.

10. The system of claim 9, wherein the control system is configured to detect the error of the ambient sensor in response to the resistance of the ambient sensor being outside of a target range.

11. A method for a heating, ventilation, and air conditioning (HVAC) system, comprising:
    detecting a status of an ambient sensor of the HVAC system when the HVAC system is in an active operating mode;
    determining a type of HVAC unit included in the HVAC system;
    determining a mode of operation of the HVAC unit; and
    operating a compressor and a fan of the HVAC system based on detection of an error of the ambient sensor, the type of HVAC unit, and the mode of operation of the HVAC unit, wherein the error of the ambient sensor comprises an interruption of a signal from the ambient sensor to the control system, a short circuit of the ambient sensor, a defect of the ambient sensor, or any combination thereof.

12. The method of claim 11, comprising detecting an operating parameter of a working fluid flowing through a heat exchanger coil of the HVAC unit.

13. The method of claim 12, comprising shutting down the compressor and the fan upon detecting the error of the ambient sensor when the operating parameter of the working fluid flowing through the heat exchanger coil of the HVAC unit falls below a threshold value and when the HVAC unit is a heat pump operating in a heating mode.

14. The method of claim 13, comprising activating the compressor and the fan when the operating parameter of the working fluid flowing through the heat exchanger coil of the HVAC unit exceeds an additional threshold value, wherein the additional threshold value is greater than the threshold value.

15. The method of claim 13, comprising activating the compressor and the fan when the control system detects that the ambient sensor is operational.

16. The method of claim 11, wherein the ambient sensor is an ambient temperature sensor.

17. A control system for a heating, ventilation, and air conditioning (HVAC) system configured to execute a set of instructions, wherein the instructions are configured to:
    detect a status of an ambient sensor of the HVAC system during an active operating mode of the HVAC system;
    determine a type of HVAC unit included in the HVAC system;
    determine a mode of operation of the HVAC unit; and
    operate a compressor and a fan of the HVAC system based on detection of an error of the ambient sensor, the type of HVAC unit, and the mode of operation of the HVAC unit, wherein the error of the ambient sensor comprises an interruption of a signal from the ambient sensor to the control system, a short circuit of the ambient sensor, a defect of the ambient sensor, or any combination thereof.

18. The control system of claim 17, wherein the ambient sensor is an ambient temperature sensor.

19. The control system of claim 17, wherein the instructions are configured to adjust a speed of the compressor in response to detection of the error of the ambient sensor.

20. The control system of claim 17, wherein the instructions are configured to adjust a speed of the fan to a threshold speed in response to detection of the error of the ambient sensor.

* * * * *